United States Patent [19]

Gaultier

[11] Patent Number: 5,592,386
[45] Date of Patent: Jan. 7, 1997

[54] METHOD AND APPARATUS FOR THE DETECTION OF RECIPROCATING MACHINE FAULTS AND FAILURES

[75] Inventor: Philippe Gaultier, Ste-Geneviève, Canada

[73] Assignee: Noranda Inc., Toronto, Canada

[21] Appl. No.: 499,649

[22] Filed: Jul. 7, 1995

Related U.S. Application Data

[63] Continuation of Ser. No. 124,068, Sep. 21, 1993, abandoned.

[30] Foreign Application Priority Data

Oct. 23, 1992 [CA] Canada ..................................... 2081080

[51] Int. Cl.⁶ .............................. G06F 19/00; G06G 7/70
[52] U.S. Cl. ................................ 364/431.01; 364/431.03; 364/551.01; 73/116; 73/117.3; 73/115; 74/573 R; 74/604; 123/192.2; 123/192.1; 123/339.19; 123/416
[58] Field of Search .................................. 74/573 R, 604; 123/192.2, 436, 339.14, 192.2, 192.1, 416–417; 73/116, 117.3, 112, 115, 862, 119 R; 464/180; 364/431.08, 431.01, 431.04, 431.07, 550, 431.03, 551.01, 431.02

[56] References Cited

U.S. PATENT DOCUMENTS

| | | | |
|---|---|---|---|
| 3,789,816 | 2/1974 | Taplin et al. | 123/436 |
| 3,815,411 | 6/1974 | Emerson | 73/117.3 |
| 3,860,365 | 1/1975 | Bibbens | 418/61.2 |
| 4,015,466 | 4/1977 | Stick et al. | 73/116 |
| 4,015,467 | 4/1977 | Armstrong | 73/116 |
| 4,055,998 | 11/1977 | Pettingell et al. | 73/119 R |
| 4,126,037 | 11/1978 | Hanson et al. | 73/116 |
| 4,197,767 | 4/1980 | Leung | 123/179.16 |

(List continued on next page.)

FOREIGN PATENT DOCUMENTS

| | | | |
|---|---|---|---|
| 65460/80 | 7/1981 | Australia | G01M 15/00 |
| 41373/85 | 11/1985 | Australia | G01L 3/10 |
| 655505 | 4/1993 | Australia | G01M 15/00 |

OTHER PUBLICATIONS

Wintjes et al., "Instantaneous Rotational Velocity Measurement for Detection and Diagnosis of Reciprocating Engine and Compressor Faults", Preprint, 7th Reciprocating Machinery Conference, Sep. 9, 1992.

Sood et al., IEEE Transactions on Industrial Electronics, 1985, IE–32(4), 294 Jan. 1985 Engine Fault Analysis: Part I—statistical Methods.

Sood et al., IEEE Transactions on Industrial Electronics, 1985, IE–32(4), 301 Jan. 1985 Engine Fault Analysis: Part II—Parameter Estimation Approach.

Citron et al., SAE Technical Paper Series, p. 131, No. 890486, International Congress and Exposition, Feb. 27–Mar. 3, 1989, Reprinted from SP–771—Sensors and Actuators: 1989.

*Primary Examiner*—Kevin J. Teska
*Assistant Examiner*—Jacques Louis-Jacques
*Attorney, Agent, or Firm*—Fitzpatrick, Cella, Harper & Scinto

[57] ABSTRACT

In a method and apparatus for detection of reciprocating machine faults and failures, data representing velocity variation waveforms of a reciprocating machine having a plurality of cylinders is acquired. The acquired data is transformed using a computer to produce torque waveforms corresponding to the acquired velocity variation waveforms. An optimization algorithm is used to obtain a number of parameters corresponding to the number of cylinders of the machine for both compression and expansion cycles of the machine in an independent manner and for each cylinder. The optimized parameters and the transformed torque waveforms are then presented to the user to identify each cylinder's condition.

20 Claims, 7 Drawing Sheets

U.S. PATENT DOCUMENTS

| | | | |
|---|---|---|---|
| 4,277,830 | 7/1981 | Reid et al. | 364/431.01 |
| 4,292,670 | 9/1981 | Reid et al. | 364/431.04 |
| 4,292,841 | 10/1981 | Wesley | 78/119 A |
| 4,532,592 | 7/1985 | Citron et al. | 364/431.05 |
| 4,539,841 | 9/1985 | Schroeder et al. | 73/116 |
| 4,545,341 | 10/1985 | Corey et al. | 123/192.2 |
| 4,562,728 | 1/1986 | Timmerman | 73/116 |
| 4,627,275 | 12/1986 | Henein et al. | 73/112 |
| 4,641,517 | 2/1987 | Spock et al. | 73/116 |
| 4,651,563 | 3/1987 | Zweifel | 73/116 |
| 4,667,532 | 5/1987 | Holz et al. | 74/573 R |
| 4,697,561 | 10/1987 | Citron | 123/339.14 |
| 4,843,870 | 7/1989 | Citron et al. | 73/116 |
| 4,984,432 | 1/1991 | Corey | 62/87 |
| 5,041,980 | 8/1991 | Maddock et al. | 364/431.03 |
| 5,239,473 | 8/1993 | Ribbens et al. | 364/431.08 |
| 5,243,852 | 9/1993 | Morita | 73/117.3 |

METHOD AND APPARATUS FOR THE DETECTION OF RECIPROCATING MACHINE FAULTS AND FAILURES

This application is a continuation of application Ser. No. 08/124,068 filed Sep. 21, 1993, now abandoned.

BACKGROUND OF THE INVENTION

This invention relates to a method for the detection of reciprocating machine (engine, compressor, etc.) faults and failures using the so-called Instantaneous Rotational Velocity (IRV) method.

Instantaneous Rotational Velocity (IRV) is based on the premise that the speed of an engine varies during each revolution. In the simplest case, a single cylinder engine, the gas in the cylinder is compressed by the rising piston and when the ignition of the gas occurs the piston is pushed back down. As the piston again rises, it is slowed down because of the energy required to compress the gas in the cylinder and by friction and inertial forces within the mechanical system. During the expansion stroke the piston is accelerated downward. This cyclical acceleration and deceleration is used to monitor the amount of energy (torque) that the piston supplies to the engine.

In a multi-cylinder engine each piston, in turn, provides energy to the system. Because cylinders fire in sequence there are a number of accelerations and decelerations every time that the engine completes a full revolution. By analyzing these speed variations it is possible to detect changes in the performance of the engine.

Considerable work has been done in the field of engine fault detection and analysis using engine speed fluctuations, as disclosed in the following articles:

Citron, S. J., O'Higgins, J. E. and Chen, L. Y., "Cylinder by cylinder engine pressure and pressure torque waveform determination utilizing speed fluctuations", SAE International Congress and Exposition, Detroit, Mich., Feb. 27–Mar. 3, 1989, Paper No. 890486.

Freestone, J. W. and Jenkins, E. G., "The diagnosis of cylinder power faults in diesel engines by flywheel speed measurement", International Conference on Vehicle Condition Monitoring, IMechE, London, England, 1985, Paper No. C33/85.

Mauer, G. F. and Watts, R. J., "On-line cylinder diagnostics on combustion engines by noncontact torque and speed measurements", SAE International Congress and Exposition, Detroit, Mich., Feb. 27–Mar. 3, 1984, Paper No. 890485.

Sood, A. K., Fahs, A. A. and Henein, N. A., "A real-time microprocessor-based system for engine deficiency analysis", IEEE Transaction on Industrial Electronics, Volume IE-30, Number 2, May 1983, p. 159.

Sood, A. K., Friedlander, C. B. And Fahs, A. A., "Engine fault analysis: part I—statistical methods", IEEE Transaction on Industrial Electronics, Volume IE-32, Number 4, November 1985, p. 294.

Sood, A. K., Fahs, A. A., and Henein, N. A., "Engine fault analysis: part II—parameter estimation approach", IEEE Transaction on Industrial Electronics, Volume IE-32, Number 4, November 1985, p. 301.

Likewise, several approaches have been patented to apply this technology towards diesel and spark ignition engines (see U.S. Pat. Nos. 4,843,870; 4,697,561; 4,532,592; 4,197,767; 4,292,670; 3,789,816).

The above prior art has been geared at using the variation of angular velocity as a fuel injection monitoring system and for the control of engines. It is the object of the present invention to use the angular velocity data to identify any changes in the condition of the engine.

SUMMARY OF THE INVENTION

The method in accordance with the present invention comprises:

a) acquiring data representing the velocity variation waveforms of a reciprocating machine;

b) transforming such data using a micro-computer to produce torque waveforms corresponding to the acquired machine velocity waveforms;

c) using an optimization algorithm to obtain a number of parameters corresponding to the number of cylinders of the machine for both compression and expansion cycles of the machine; and d) presenting the optimized parameters and transformed torque waveforms to a user to identify the faults and failures of the machine.

The term expansion is used herein to designate the effects of injection and ignition.

The data is preferably low pass filtered to remove systematic errors generated by the data acquisition system.

The parameters are preferably presented in a graphical format for interpretation by the user.

BRIEF DESCRIPTION OF THE DRAWINGS

The invention will now be disclosed, by way of example, with reference to the accompanying drawings in which.

DETAILED DESCRIPTION OF THE PRESENTLY PREFERRED EMBODIMENT

The system for carrying out the method in accordance with the present invention is divided into the following modules: acquisition system, data filtering and transformation, optimization, and data presentation in a graphical format, for user interpretation.

Acquisition System

Figure 1A:
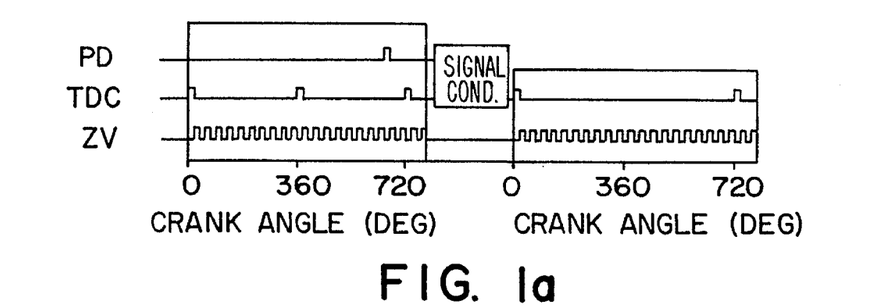
FIG. 1a is a diagram illustrating the signals sensed by the various sensors of the acquisition system.
Figure 1B:
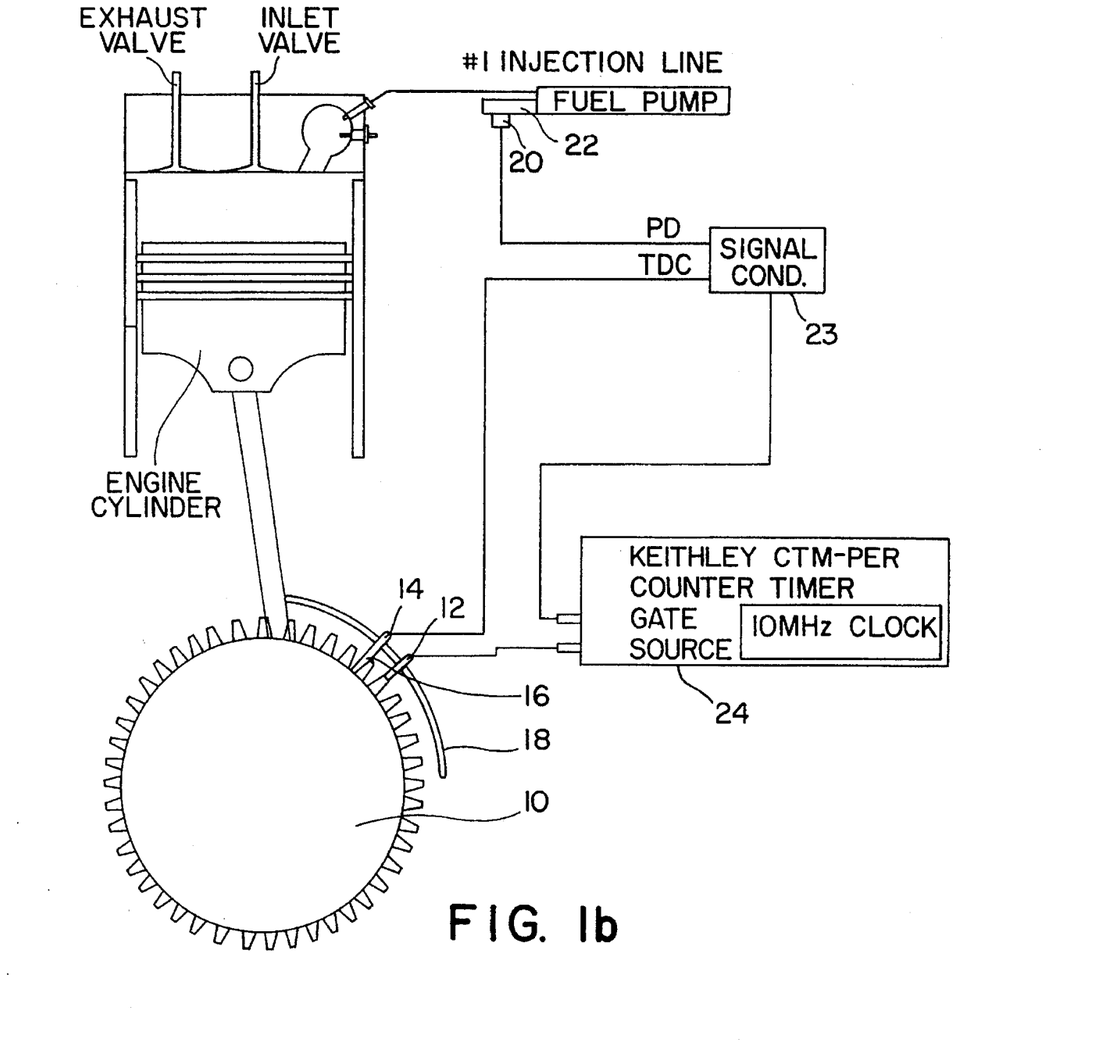
FIG. 1 is a diagram illustrating the various elements of the data acquisition system.

Referring to FIG. 1 acquisition system is designed to monitor the speed variations that occur on the flywheel 10 to an engine. Since the flywheel is connected to the crankshaft, the speed of the flywheel can be directly correlated to the crankshaft and thus to the cylinders. Using the simple relation $$\bar{\omega} = \frac{\Delta\theta}{n_c} \times f_c \quad (1)$$

where $\bar{\omega}$=the angular velocity of the flywheel $n_c$=the number of counts of a clock $f_c$=the frequency of a clock $\Delta\theta$=degrees between consecutive teeth it is possible to determine the instantaneous angular velocity of the flywheel based on the time taken by two successive flywheel teeth to pass the sensor.

As shown in FIG. 1, three sensors are used in acquiring the engine velocity waveform. The first sensor, the zero velocity sensor (ZV), is an active inductive pickup 12 placed in close proximity to the flywheel ring gear teeth providing a TTL signal at the rising edge of each gear tooth. The second sensor, the top dead centre sensor (TDC), is a passive inductive pickup 14 placed in close proximity to a marker 16 on the flywheel. This sensor initiates a TTL signal each time cylinder number one is at top dead centre providing an accurate measurable milestone of the engine's position. Sensors 12 and 14 are mounted on bell housing 18. The third sensor, the phase sensor (PS), is a passive magnetic pickup 20 placed in close proximity to a marker 22 situated on the fuel pump. This sensor provides a TTL pulse to synchronize the phase of a four stroke engine. If a two stroke engine is analyzed this sensor is not required.

The data collected from the zero velocity sensor is the number of counts, of a 10 MHz clock, that occur between consecutive gear teeth TTLs. The counts are acquired using a Metrabyte CTM-PER (trademark of Keithley Metrabyte) counter time board 24 including a 10 MHz clock. The TTL pulses generated by the TDC sensor and the phase sensor are passed through a signal conditioner to generate a single TTL pulse at the appropriate expansion TDC of cylinder #1. The resulting TTL pulse is fed to the gate of the counter timer board to initiate counting of the pulses of the source. The above TTL signals are shown in FIG. 1A.

Figure 2:
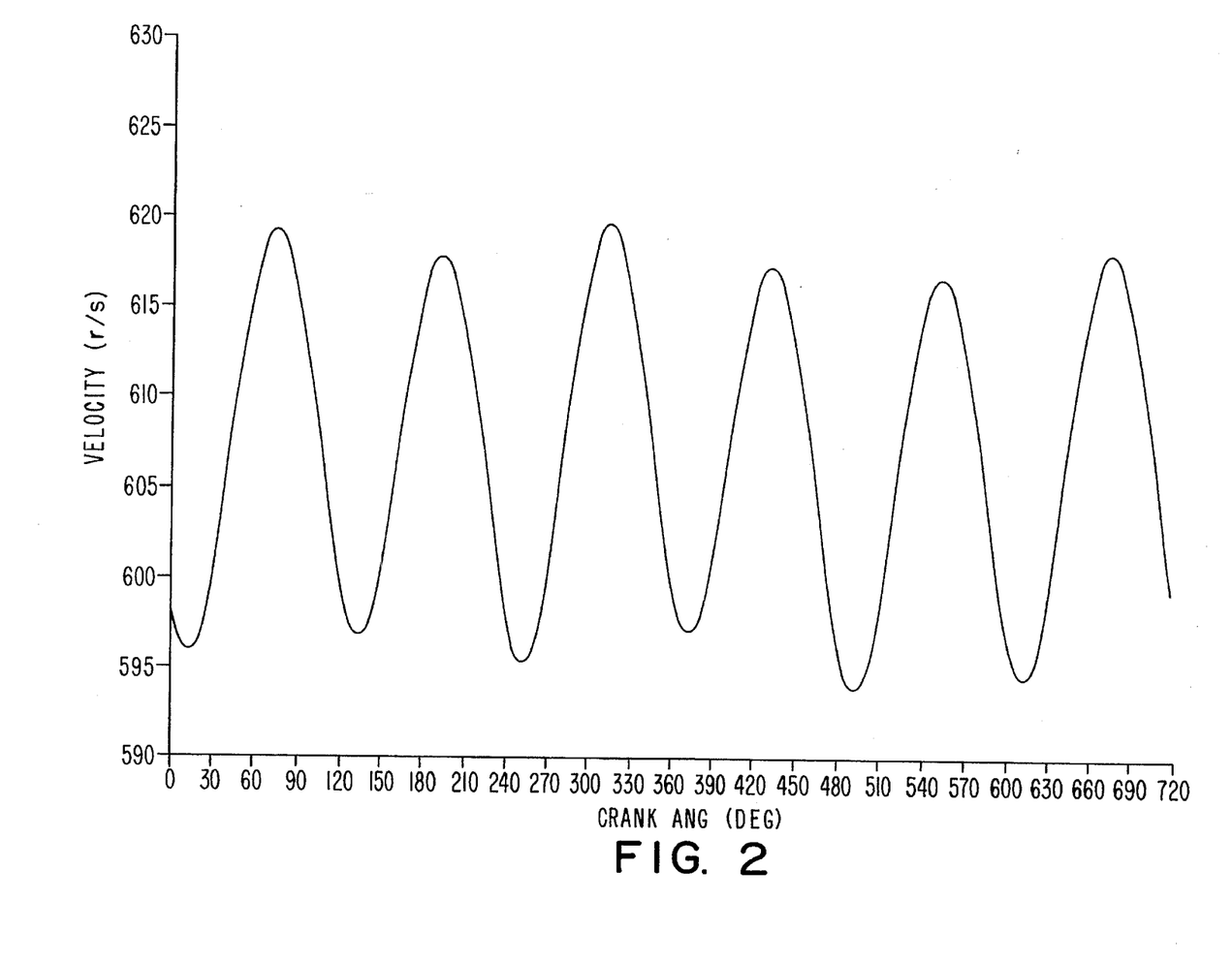
FIG. 2 is a plot of velocity versus crank shaft angle of a four stroke engine.

Using equation (1) the number of clock counts can be transformed into the actual velocity of the flywheel. A plot of velocity versus crank angle (note 720 degrees since 4 stroke engine) is shown in FIG. 2.

Data Analysis

Several techniques have been proposed to analyze the variational velocity waveform generated by an engine. All references agree that digital filtering of the response signal is necessary to remove systematic error generated by marker spacing (MSE) on the flywheel and the acquisition system. What has not been agreed on is how to interpret the data collected. As mentioned earlier the acquired signal can be used for engine monitoring or control. The focus taken in the present patent application is that of monitoring. Specifically, the diagnosis of compression and injection engine faults are desired.

Sood et. al. [1985] developed three methods of diagnosing faulty cylinders using, statistical correlation, similarity measures and Baysian approaches. All three methods employed the variational velocity waveform. Shortcomings of the model were the inability to diagnose small faults and distinguish between injection and compression faults.

Citron et. al. [1989] developed a model that uses functional representations of the engine pressure waveforms to describe individual cylinder pressure. The results are used for diagnosis and applied to engine control strategies. The process is easily applied to engines which have firing angles in the vicinity of 180°. (This is not the case for engines used in the mining industry. In such engines the firing angles can be as low as 30° apart). The process involves translating the flywheel velocity waveforms to engine torque via a four degree of freedom elastic model and finally to pressure using the torque radius of each cylinder.

Based on this prior art the applicant has developed a new method for the analysis of the acquired data, to allow a user to determine the relative health of the engine. The method involves the use of the torque waveform derived from the acquired velocity waveform and is referred to as torque waveform modelling (TWM). This acquired torque waveform is then compared to theoretical cylinder torque waveforms, produced by a model, to diagnose engine faults.

Torque Waveform Modelling (TWM)

Figure 3A:
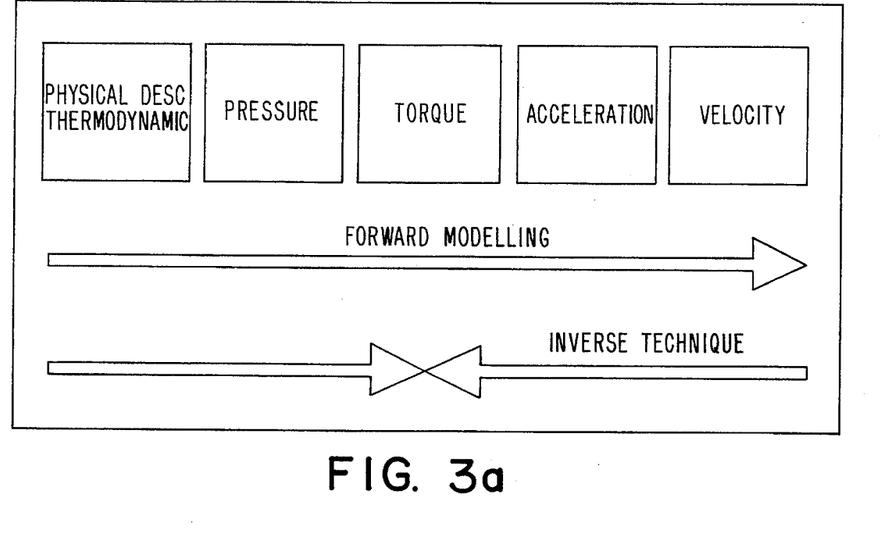
FIG. 3a is a diagram illustrating the main parameters that are used in modelling of the velocity waveforms of an engine, the top arrow indicating conventional forward modelling, the bottom arrows, the inverse modelling technique in accordance with the present invention.

FIG. 3a outlines the principle of the TWM method. In forward modelling such as disclosed in Sood et al. [1985], physical and thermodynamic data are used to model the pressures within the cylinders (upper arrow in FIG. 3a). These pressures are then used to determine the torque that is applied to the crankshaft. Combined with engine data the torque yields the acceleration and velocity of the flywheel.

In the present invention, the monitoring system is used to acquire the velocity of the flywheel. Using this velocity data an inverse technique is developed to provide the user with an idea of the health of the engine.

It is not possible to calculate the pressure data from the velocity data directly. When going from the torque waveform to the pressure waveform there is a known mathematical singularity that occurs when the piston connecting rod is directly inline with the centre of the crankshaft, thus making it mathematically impractical to obtain the pressure waveform.

Figure 3B:
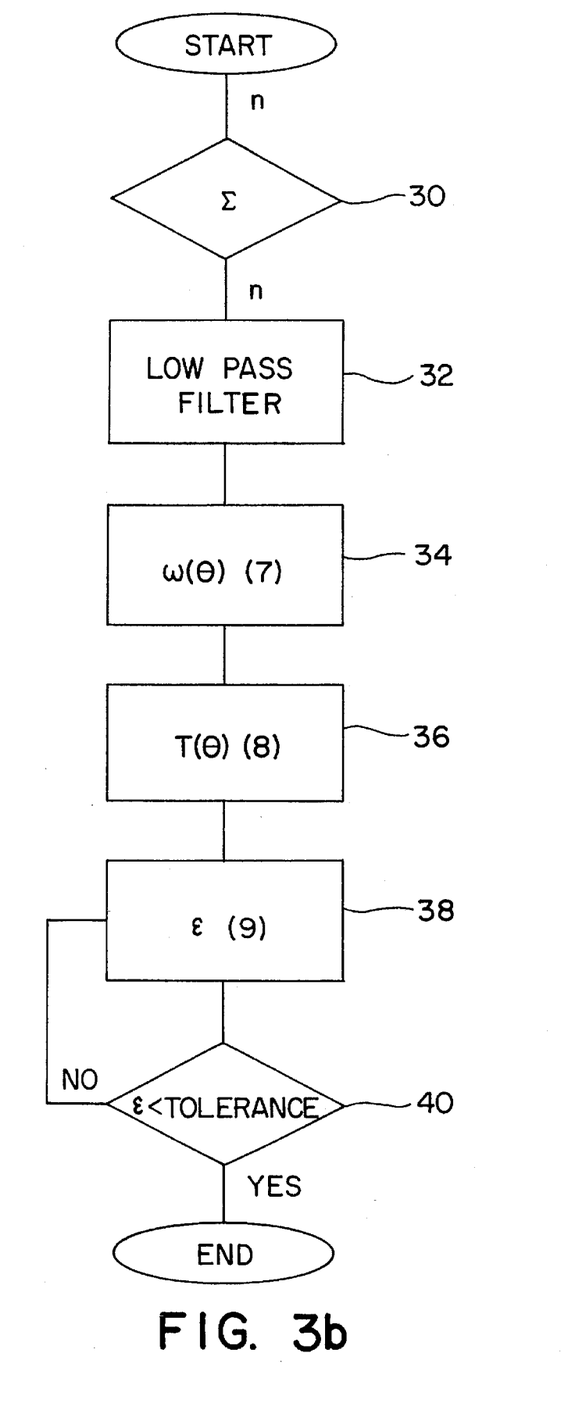
FIG. 3b is a flow diagram of the method in accordance with the present invention including data acquisition, filtering and transformation of the acquired velocity waveforms into torque waveforms, and optimization using optimization algorithms to determine the cylinder parameters that best approximate the torque waveforms derived from the acquired data.

Because of this singularity a hybrid approach (TWM) is used in the development of the engine health monitoring system as shown in the flow diagram of FIG. 3b. The angular velocity data acquired over a number of engine resolutions (ex. 30) is summed and averaged as indicated by block 30. The angular velocity data is then filtered in a low pass filter 32. The filtered angular velocity data as indicated by block 34 is then transformed to produce a torque waveform as shown by block 36. The equations used in the transformations can be found in Sood et al. [1985] but will be shown in brief here. The variables used in the equations can be located in the following glossary of terms:

GLOSSARY OF TERMS

δ—offset angle between consecutive cylinders

ω—rotational velocity of the flywheel

ω'—first derivative of ω with respect to the crankshaft angle m—mass of the reciprocating parts r—crank radius l—connecting rod length $\epsilon$—error constant between theoretical and test engine torque waveforms
$T(\theta)$—torque from all cylinders superimposed
$T(\theta_I)$—torque contributed by the $i^{th}$ cylinder
$T^c(\theta_i)$—torque due to compression forces
$T'(\theta_i)$—torque due to expansion forces
$f^c, f_i^c$—level of fault due to compression
$f^I, f_i^I$—level of fault due to injection
n—number of cylinders
$f_c$—counting clock frequency
$\Delta\theta$—angle between consecutive bull ring gear teeth
$b(\theta), d(\theta), G(\theta), B(\theta), D(\theta), f(\theta)$ and $g(\theta)$—simplifying functions The general equation of motion can be written for a single cylinder engine as $$\omega' = b(\theta)\omega + \frac{T_E}{d(\theta)} \omega^{-1} \tag{2}$$

where, $$\omega' = \frac{d\omega}{d\theta}$$

$$d(\theta) = mr \left[ \frac{l}{mr} + G(\theta)f(\theta) \right]$$

$$b(\theta) = -\frac{G(\theta)g(\theta)}{\frac{l}{mr} + G(\theta)f(\theta)}$$

$$G(\theta) = r \sin(\theta) + \frac{r^2}{l} \left[ \frac{\sin(\theta)\cos(\theta)}{\sqrt{1 - \frac{r^2}{l^2}\sin^2(\theta)}} \right]$$

$$g(\theta) = \cos(\theta) + \frac{r}{l} \left[ \frac{\cos(2\theta)}{\sqrt{1 - \frac{r^2}{l^2}\sin^2(\theta)}} \right] +$$

$$\frac{r^3}{4l^3} \left[ \frac{\sin^2(2\theta)}{\left[1 - \frac{r^2}{l^2}\sin^2(\theta)\right]^{3/2}} \right]$$

$$f(\theta) = \sin(\theta) + \frac{r}{2l} \left[ \frac{\sin(2\theta)}{\sqrt{1 - \frac{r^2}{l^2}\sin^2(\theta)}} \right]$$

For multiple cylinder engines the equations can be extended to the following manner.

$$\omega' = B(\theta) \omega + \frac{\sum_{i=1}^{n} T(\theta_i)}{D(\theta)} \omega^{-1} \tag{3}$$

where, $$B(\theta) = \frac{-\sum_{i=1}^{n} (g(\theta_i) G(\theta_i))}{\frac{l}{mr} + \sum_{i=1}^{n} (f(\theta_i) G(\theta_i))} \tag{4}$$

$$D(\theta) = l + mr \sum_{i=1}^{n} (f(\theta_i) G(\theta_i)) \tag{5}$$

The individual cylinder angles $\theta_I$ are calculated in relation to the crank angle $\theta$ and the offset between consecutive cylinders $\delta$.

$$\theta_I = \theta - \delta(I-n), I=1,2,\ldots,n \tag{6}$$

With the use of equation (3) a complete model of the system exists. The forward dynamic solution would require the input of cylinder torque. Typical engine pressure profiles can be created using classical thermodynamic equations.

The inverse dynamic solution, where angular velocity is input, is far more challenging. The synthesis of individual cylinder torques can be quite easily superimposed in the forward model. In the inverse model the decomposition of the engine cylinder torques is far more difficult and subject to inaccuracies. The application of experimental velocity profiles provides an estimate of the forward parameter of torque. The relationship for torque can be written as follows.

$$\tilde{T}(\theta) = \sum_{i=1}^{n} \tilde{T}(\theta_i) = \tilde{\omega} D(\theta) (\tilde{\omega}' - B(\theta) \tilde{\omega}) \tag{8}$$

where the "~" represents the measured quantity from the engine.

An optimization algorithm is used to determine the cylinder parameters that best approximate the torque waveform obtained from the sensor data (Equation 8). The following equation represents the optimization process.

$$\epsilon = \tilde{T}(\theta) - \sum_{i=1}^{n} T^c(\theta_i) f_i^c + T'(\theta_i) f_i^I, \quad n=1,2,\ldots \tag{9}$$

This model is used to run a number of iteration attempting to recreate the same waveform, as illustrated by blocks 38 and 41 of FIG. 3b.

In equation (9), the variables $T^c(\theta_i)$ are the contributions to the torque waveform due to compressive forces $180°<\theta_i<540°$ and $T^I(\theta_i)$ is the torque contributed by the expansion forces approximately $360°<\theta_i<540°$ solely due to the added energy from the fuel's combustion. In this model frictional forces are not accounted for. Once calculation of $f^c$ and $f^I$ is performed the individual cylinder performance is known.

The above bi-directional approach to the solution is represented by the two arrows at the bottom of FIG. 3a.

The method does have a number of inherent limitations, however it is important to realize that the system is designed to highlight engine degradation and not model engines. As such the torque waveform that is provided by the model is a relative waveform where each cylinder is compared to every other cylinder in the engine. Any error inherent in the system is the same for each cylinder and thus looking at the difference in torque between two cylinders is more important than the actual (true algebraic) value of the torque. It is important to note that this method is independent of engine type and number of cylinders.

Figure 4:
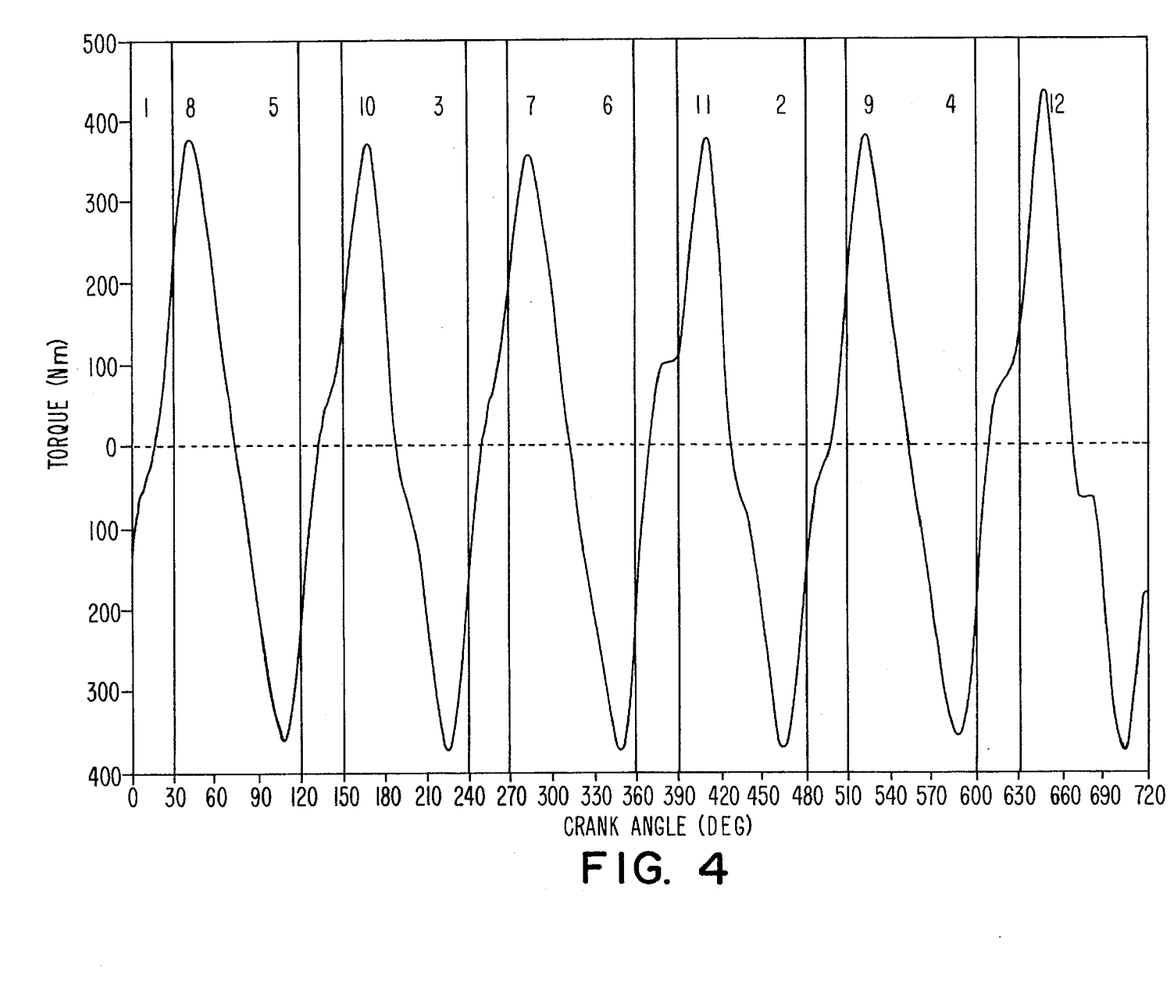
FIG. 4 illustrates an engine torque waveform without induced faults.
Figure 5:
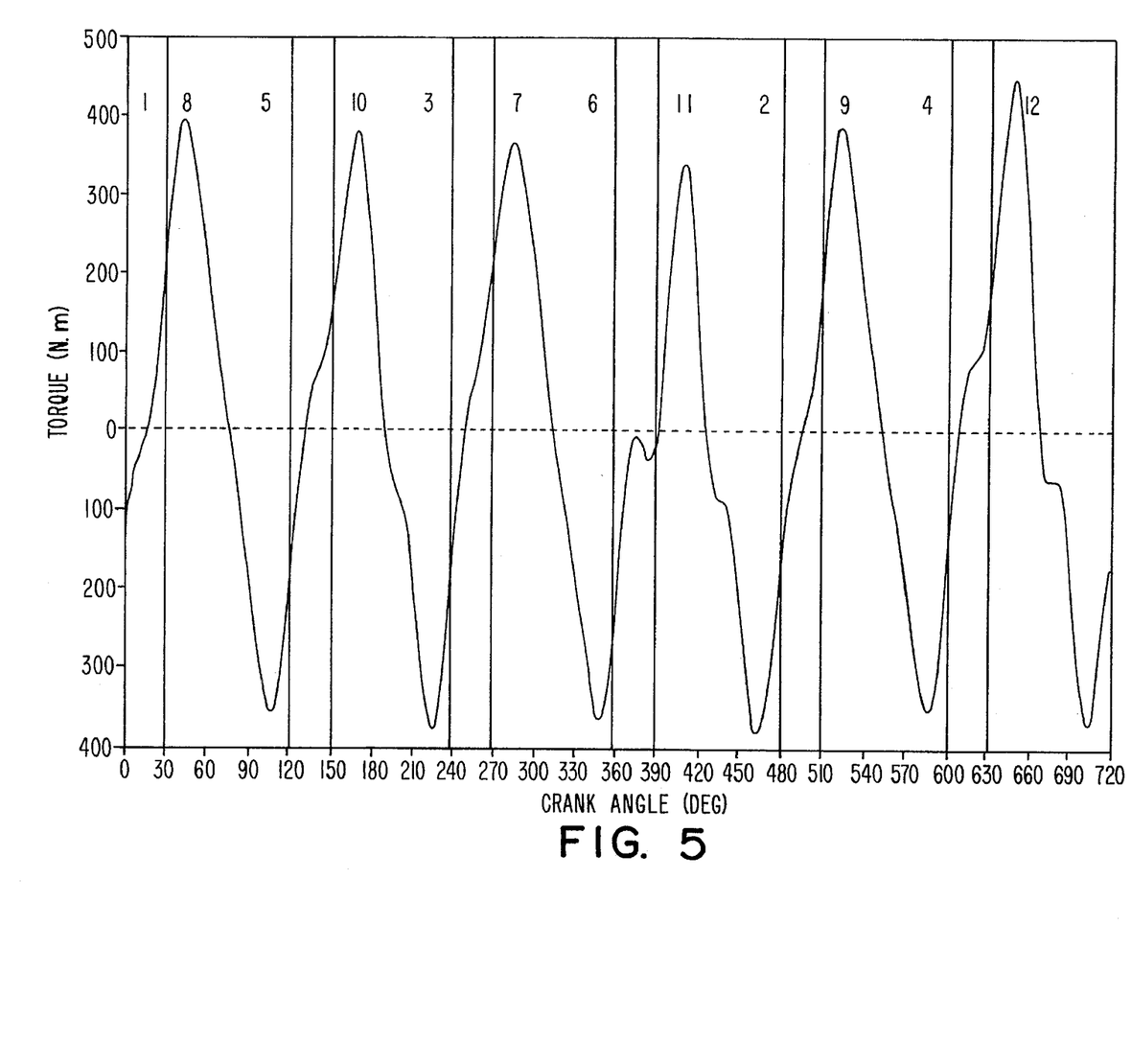
FIG. 5 illustrates a torque waveform with a 100% injection fault induced on cylinder #6.
Figure 6:
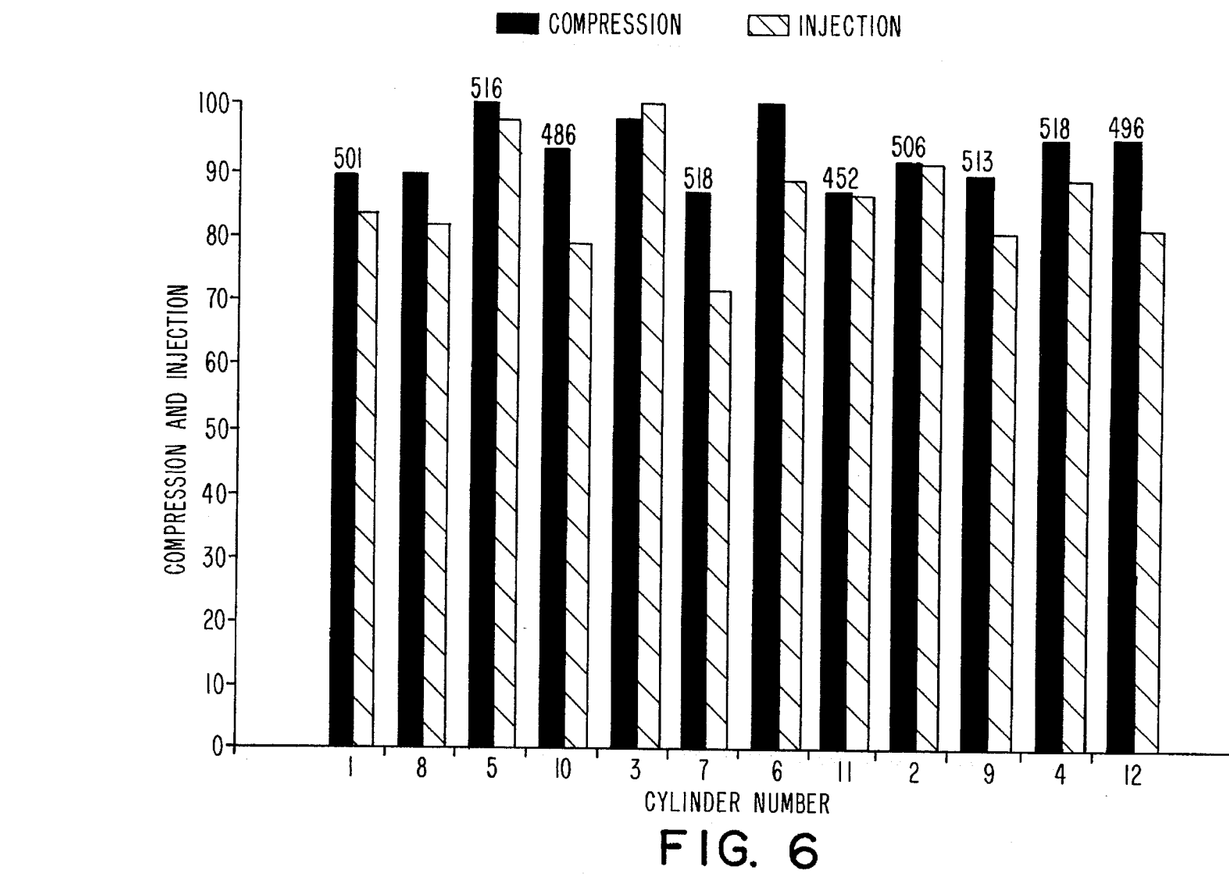
FIG. 6 is a bar graph illustrating a comparison of compression and injection faults detected by the model in accordance with the present invention.

Examples of the types of curves produced for user interpretation are shown in FIG. 4, FIG. 5 and FIG. 6. FIG. 6 shows a comparison of the compression and injection faults predicted by the optimizing algorithm for torque waveform in FIG. 4. Each bar represents the coefficient $f_i^I$ and $f_i^C$ for expansion and compression faults respectively. This is the first graph that a user should interpret. Looking at the height of each of the bars in the figure will give the user an approximation of the expansion and compression condition of each of the cylinders in the engine. If the figure shows that there is a major difference between a number of the bars then the user can assume that the engine is no longer functioning properly and thus is not providing the maximum amount of power. In FIG. 6 cylinder #7 is shown to have a small injection fault as can be validated by examining the low level of torque in cylinder #7 of FIG. 4.

The experimental engine specifications are given in the following Table 1. The engine is a Deutz F12L-413FW.

TABLE I

Experimental Engine Specifications

| Engine Parameter | Values (units) |
| --- | --- |
| Piston Diameter | 124.9 (mm) |
| Connecting Rod Length | 238.0 (mm) |
| Crank Radius | 65 (mm) |
| Mass of Reciprocating Parts | 500 (g) |
| Flywheel Inertia | 1.375 (kg m |
| Number of Cylinders | 12 |
| Engine Firing Angles | 0, 30, 120, 150, . . . (degrees) |
| Number of Strokes | 4 |
| Number of Teeth on Bull Ring Gear | 167 |
| Cylinder Firing Order | 1-8-5-10-3-7-6-11-2-9-4-12 |
| Compression Pressure | 360–510 psi |
| Compression Ratio | 19.5:1 |
| Polytropic Coefficient | 1.34 |
| Low Idle | 600 RPM |
| High Idle | 2300 RPM |

Table II summarizes results obtained using the TWM method.

TABLE II

Fault detection using torque synthesis.

| Cylinder | Compression Fault | Injection Fault | $f_1^i + f_1^c$ | % Reduction from Base |
| --- | --- | --- | --- | --- |
| 6 | 0 (620) | 0 (200) | 0.91 | 0 |
| 6 | 0 | 100% (0) | 0.41 | 55 |
| 6 | 0 | 56% (89) | 0.51 | 44 |
| 6 | 0 | 37% (126) | 0.68 | 25 |
| 6 | 50% (310/620) | 100% (0) | 0.04 | 96 |
| 6 | 42% (360/620) | 100% (0) | 0.07 | 92 |
| 6 | 32% (420/620) | 100% (0) | 0.16 | 82 |
| 6 | 23% (480/620) | 100% (0) | 0.37 | 59 |
| 6 | 13% (540/620) | 100% (0) | 0.42 | 54 |
| 6 | 2% (610/620) | 100% (0) | 0.50 | 45 |
| 6 | 2% (610/620) | 45% (105) | 0.54 | 41 |
| 6 | 2% (610/620) | 0% (192) | 0.81 | 11 |
| 6 | 21% (490/620) | 100 (0) | 0.40 | 56 |
| 6 | 21% (490/620) | 38% (125) | 0.50 | 45 |
| 6 | 21% (490/620) | 0% (200) | 0.74 | 19 |
| 5 | 0 | 100% (0) | 0.52 | 38 |
| 5 | 0 | 54% (70) | 0.63 | 25 |
| 5 | 0 | 0 (151) | 0.84 | 0 |
| 11 | 0 | 100% (0) | 0.38 | 46 |
| 11 | 0 | 25% (130) | 0.60 | 14 |
| 11 | 0 | 0 (172) | 0.70 | 0 |
| 5/6 | 0/0 | 100% (0)/100% (0) | 0.49/0.52 | 42/43 |
| 6/11 | 0/0 | 100% (0)/100% (0) | 0.41/0.53 | 55/25 |

A good indication of overall cylinder health is the sum of the two coefficients $f_i^I + f_i^C$. This therefore combines the effects of compression and injection faults. The fourth column of Table II represents these values for the case studies. The fifth column provides an indication of the correlation between the faults and the reduction in cylinder performance.

Once the histogram (FIG. 6) has been used to determine that there is an engine imbalance, it is possible to use the torque waveforms (FIG. 4 or FIG 5) to determine the cause of the problem. Interpreting the torque waveform requires some experience and a very good understanding of engines. By comparing the torque waveforms the user can see a marked difference between the two graphs (FIGS. 4 and 5). The location of any change in waveform indicates the engine angle at which a fault is occuring (in this case at approx. 360°).

The above disclosed use of Instantaneous Rotational Velocity (IRV) system allows an operator to:

a) monitor any reciprocating engine, with a minimum of instrumentation, to acquire data representing the speed variations of the engine;

b) analyze and transform the data using a micro-computer to produce torque waveforms from the acquired velocity waveforms;

c) obtain a number of parameters describing the relative health of the cylinder, using an optimization algorithm;

d) create graphs of the analysis results;

e) and interpret the graphs to identify the cylinders that are contributing the least to the overall power of the engine.

To the applicant's knowledge the system that is described in the present patent application is unique and generic to all engines. Although the modelling and the acquisition of the signal have been covered in prior research, the combination of the acquisition, analysis and data presentation modules as disclosed in the present patent application is novel.

The system has been tested in both mobile mining engine fault detection and natural gas compressor drivers. Overall the system yields good practical results, that back up the theoretical results obtained during the development of the system.

Although the invention has been disclosed with reference to engines, it is to be understood that it can also be used with compressors and other reciprocating machines. In addition, the method in accordance with the present invention can be used to monitor any internal combustion engines.

I claim:

1. A method for detection of reciprocating machine faults and failures, comprising the steps of:

a) acquiring data representing velocity variation waveforms of a reciprocating machine having a plurality of cylinders;

b) transforming said acquired data using a computer to produce torque waveforms corresponding to the acquired velocity variation waveforms;

c) using a model-based optimization algorithm to obtain:
   (i) a coefficient corresponding to the compression cycle for each cylinder, and
   (ii) a coefficient corresponding to the expansion cycle for each cylinder, wherein the coefficient corresponding to the expansion cycle is derived independently from the coefficient corresponding to the compression cycle;

d) presenting the compression coefficient, the expansion coefficient, and the transformed torque waveforms to a user to distinguish between compression faults and expansion faults for each cylinder; and e) determining a reciprocating machine imbalance by detecting at least one of the compression fault and the expansion fault.

2. A method as defined in claim 1, wherein the data is filtered to remove systematic errors generated during data acquisition.

3. A method as defined in claim 1, wherein the coefficients are presented in a graphical format for interpretation by the user.

4. A method as defined in claim 1, wherein the torque waveform and the optimization coefficients for individual cylinders are presented for interpretation by the user.

5. A method according to claim 1, wherein the step of using a model-based optimization algorithm includes the step of using an algorithm to derive the compression cycle coefficient and the expansion cycle coefficient from torque values.

6. A method according to claim 1, wherein said optimization algorithm includes parameters corresponding to the mass of the reciprocating parts.

7. A method according to claim 1, wherein the sum of compression and expansion optimization coefficients for each cylinder are presented to the user.

8. A method according to claim 1, wherein said optimization algorithm is independent of engine type and number of cylinders.

9. A method according to claim 1, wherein the algorithm is optimized by running a plurality of iterations.

10. A method according to claim 1, wherein said step of using an optimization algorithm includes the step of iterating $f_i^c$ and $f_i'$ in the following equation to optimize $\epsilon$:

$$\epsilon = T(\theta) - \sum_{i=1}^{n} T^c(\theta_i) f_i^c + T'(\theta_i) f_i', \quad n = 1, 2, \ldots$$

where $\epsilon$ comprises a near-defined error constant between theoretical and test engine torque waveforms; $\tau(\theta)$ comprises torque from all cylinders superimposed; $\tau^c(\theta_i)$ comprises torque due to compression forces for each cylinder i; $f_i^c$ comprises the compression coefficient for each cylinder i; $\tau'(\theta_i)$ comprises torque due to expansion forces for each cylinder i; $f_i'$ comprises the expansion coefficient for each cylinder i; and n comprises the cylinder number.

11. A method for detection of reciprocating machine faults and failures, comprising the steps of:

acquiring data representing velocity variation waveforms of a reciprocating machine having a plurality of cylinders;

transforming said acquired data using a computer to produce torque waveforms corresponding to the acquired velocity variation waveforms;

using a model-based optimization algorithm to obtain a compression coefficient for each cylinder and an expansion coefficient for each cylinder by iterating $f_i^c$ and $f_i'$ in the following equation to optimize $\epsilon$:

$$\epsilon = T(\theta) - \sum_{i=1}^{n} T^c(\theta_i) f_i^c + T'(\theta_i) f_i', \quad n = 1, 2, \ldots$$

where $\epsilon$ comprises a near-defined error constant between theoretical and test engine torque waveforms; $\tau(\theta)$ comprises torque from all cylinders superimposed; $\tau^c(\theta_i)$ comprises torque due to compression forces for each cylinder i; $f_i^c$ comprises the compression coefficient for each cylinder i; $\tau'(\theta_i)$ comprises torque due to expansion forces for each cylinder i; $f_i'$ comprises the expansion coefficient for each cylinder i; and n comprises the cylinder number;

determining a reciprocating machine imbalance by detecting at least one of a compression fault and an expansion fault utilizing said compression coefficient and said expansion coefficient.

12. A method according to claim 11, wherein said optimization algorithm includes parameters corresponding to the mass of the reciprocating parts.

13. A method according to claim 11, wherein said optimization algorithm is independent of engine type and number of cylinders.

14. A method according to claim 11, further comprising the step of presenting in graphical form the compression coefficient for each cylinder and the expansion coefficient for each cylinder.

15. A system for detection of reciprocating machine faults and failures, comprising:

means for acquiring data representing velocity variation waveforms of a reciprocating machine having a plurality of cylinders; and processing means for (i) transforming said acquired data to produce torque waveforms corresponding to the acquired velocity variation waveforms, (ii) using a model-based optimization algorithm to obtain:

a coefficient corresponding to the compression cycle for each cylinder, and a coefficient corresponding to the expansion cycle for each cylinder, the coefficient corresponding to the expansion cycle being derived independently from the coefficient corresponding to the compression cycle, (iii) outputting a first signal corresponding to the compression coefficient, and a second signal corresponding to the expansion coefficient.

16. A system according to claim 15, wherein said processing means simultaneously displays the compression coefficient and the expansion coefficient in graphical form.

17. A system according to claim 15, wherein said processing means obtains the compression coefficient and the expansion coefficient according to the following equation:

$$\epsilon = T(\theta) - \sum_{i=1}^{n} T^c(\theta_i) f_i^c + T'(\theta_i) f_i', \quad n = 1, 2, \ldots$$

where $\epsilon$ comprises a near-defined error constant between theoretical and test engine torque waveforms; $\tau(\theta)$ comprises torque from all cylinders superimposed; $\tau^c(\theta_i)$ comprises torque due to compression forces for each cylinder i; $f_i^c$ comprises the compression coefficient for each cylinder i; $\tau'(\theta_i)$ comprises torque due to expansion forces for each cylinder i; $f_i'$ comprises the expansion coefficient for each cylinder i; and n comprises the cylinder number.

18. A system according to claim 15, wherein said processing means uses the optimization algorithm by incorporating therein parameters corresponding to the mass of the reciprocating parts.

19. A system according to claim 15, wherein said processing means processes the optimization algorithm a plurality of times for each cylinder to optimize the compression coefficient and the expansion coefficient.

20. A system according to claim 15, wherein said processing means uses an optimization algorithm which is independent of engine type and number of cylinders.

* * * * *